US010935738B1

(12) United States Patent
Fincato et al.

(10) Patent No.: US 10,935,738 B1
(45) Date of Patent: Mar. 2, 2021

(54) ARCHITECTURE OF AN INTEGRATED OPTICS DEVICE

(71) Applicant: STMicroelectronics S.r.l., Agrate Brianza (IT)

(72) Inventors: Antonio Fincato, Cameri (IT); Piero Orlandi, Arcevia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/535,967

(22) Filed: Aug. 8, 2019

(51) Int. Cl.
*G02B 6/42* (2006.01)
*G02B 6/293* (2006.01)

(52) U.S. Cl.
CPC ....... *G02B 6/4215* (2013.01); *G02B 6/29352* (2013.01); *G02B 6/42* (2013.01); *G02B 6/2938* (2013.01)

(58) Field of Classification Search
CPC .... G02B 6/4215; G02B 6/29352; G02B 6/42; G02B 6/2938
USPC .......................................................... 385/14
See application file for complete search history.

(56) References Cited

U.S. PATENT DOCUMENTS

| | | | |
|---|---|---|---|
| 5,719,976 A | 2/1998 | Henry et al. | |
| 6,285,810 B1 | 9/2001 | Fincato et al. | |
| 6,639,702 B1 | 10/2003 | Chiaretti et al. | |
| 7,054,512 B2 | 5/2006 | Sugiyama et al. | |
| 7,155,072 B2 | 12/2006 | Sugiyama et al. | |
| 7,340,114 B2 | 3/2008 | Doi et al. | |
| 8,374,467 B2 | 2/2013 | Sugiyama et al. | |
| 8,406,578 B2 | 3/2013 | Oikawa et al. | |
| 9,461,769 B2 | 10/2016 | Fincato | |
| 10,133,141 B2 | 11/2018 | Evans et al. | |
| 2006/0188193 A1 | 8/2006 | Lenzi | |
| 2012/0243827 A1* | 9/2012 | Jeong | G02B 6/125 385/24 |
| 2016/0233642 A1* | 8/2016 | Takabayashi | H01S 5/4087 |

(Continued)

FOREIGN PATENT DOCUMENTS

CN 1232846 C 12/2005
JP 2015212769 A 11/2015

OTHER PUBLICATIONS

Gao, Ding-Shan, et al., "Mach-Zehnder Interferometer Based on Coupled Dielectric Pillars", Chinese Physics Letters, vol. 24, No. 11 (2007), pp. 3172-3174.

(Continued)

*Primary Examiner* — Jerry M Blevins
(74) *Attorney, Agent, or Firm* — Slater Matsil, LLP

(57) ABSTRACT

A device includes a first directional coupler and a second directional coupler. A first arched waveguide forms a first curved optical path between a first output port of the first directional coupler and a first input port of the second directional coupler. The first arched waveguide has an angle of curvature and a radius of curvature. A second arched waveguide has the angle of curvature and the radius of curvature. The first arched waveguide and the second arched waveguide each have a concavity oriented in the same direction. A first straight waveguide is coupled to a second output port of the first directional coupler and a first end of the second arched waveguide. A second straight waveguide is coupled to a second end of the second arched waveguide and a second input port of the second directional coupler.

20 Claims, 17 Drawing Sheets

(56) References Cited

U.S. PATENT DOCUMENTS

2017/0003571 A1 1/2017 Carpentier et al.
2017/0288781 A1 10/2017 Carpentier et al.

OTHER PUBLICATIONS

Dwivedi, Sarvagya, et al., "Maximizing fabrication and thermal tolerances of all-silicon FIR wavelength filters," IEEE Photonics Technology Letters, vol. 27, No. 8, Apr. 15, 2015, 4 pages.
Kleijn, Emil, et al., "Amplitude and Phase Error Correction Algorithm for 3x3 MMI Based Mach-Zehnder Interferometers," Journal of Lightwave Technology, vol. 33, No. 11, Jun. 1, 2015, 7 pages.
Okamoto, Katsunari, "Wavelength-Division-Multiplexing Devices in Thin SOI: Advances and Prospects," IEEE Journal of Selected Topics in Quantum Electronics, vol. 20, No. 4, Jul./Aug. 2014, 10 pages.

* cited by examiner

ARCHITECTURE OF AN INTEGRATED OPTICS DEVICE

TECHNICAL FIELD

This disclosure relates generally to optical communications systems and, in particular embodiments, to architecture of an integrated optics device.

BACKGROUND

Wavelength division multiplexed (WDM) optical communication systems are known in which multiple optical signals, each having a different wavelength, are combined by a multiplexer onto a single optical fiber to provide a WDM signal. Such systems typically include transmitters having a laser associated with each wavelength, a modulator configured to modulate the output of the laser to carry data, and an optical combiner to combine each of the modulated outputs. Receivers are also provided to demultiplex the received WDM signal into individual optical signals, convert the optical signals into electrical signals, and output data carried by those electrical signals. WDM multiplexers (MUXs) and demultiplexers (DEMUXs) may include one or more Mach-Zehnder (MZ) devices (e.g. an MZ interferometer).

SUMMARY

A number of embodiments and variations are disclosed herein.

In a first embodiment, a device comprises a first directional coupler and a second directional coupler. A first arched waveguide forms a first curved optical path between a first output port of the first directional coupler and a first input port of the second directional coupler. The first arched waveguide has an angle of curvature and a radius of curvature. A second arched waveguide has the angle of curvature and the radius of curvature. The first arched waveguide and the second arched waveguide each have a concavity oriented in the same direction. A first straight waveguide is coupled to a second output port of the first directional coupler and a first end of the second arched waveguide. A second straight waveguide is coupled to a second end of the second arched waveguide and a second input port of the second directional coupler. The first straight waveguide, the second arched waveguide, and the second straight waveguide form a second curved optical path between the second output port of the first directional coupler and the second input port of the second directional coupler.

In a further embodiment, a device comprises a first directional coupler and a second directional coupler. A first curved optical path comprises a first arched waveguide segment having a first end coupled to a first one of a pair of output ports of the first directional coupler, and second arched waveguide segment having a first end coupled to a second end of the first arched waveguide segment and a second end coupled to a first one of a pair of input ports of the second directional coupler. A second curved optical path comprises a first straight waveguide segment having a first end coupled to a second one of the pair of output ports of the first directional coupler and a third arched waveguide segment having a first end coupled to a second end of the first straight waveguide segment. The third arched waveguide segment has a length identical to a length of the first arched waveguide segment and the first arched waveguide and the third arched waveguide each having a concavity oriented in the same direction. The second curved optical path further comprises a second straight waveguide segment having a first end coupled to a second end of the third arched waveguide segment, a third straight waveguide segment having a first end coupled to a second end of the second straight waveguide segment, a fourth arched waveguide segment having a first end coupled to a second end of the third straight waveguide segment, and a fourth straight waveguide segment having a first end coupled to a second end of the fourth arched waveguide segment and a second end coupled to a second one of the pair of input ports of the second directional coupler. The third straight waveguide segment has a length identical to a length of the second straight waveguide segment. The fourth arched waveguide segment has a length identical to a length of the second arched waveguide segment. The second arched waveguide and the fourth arched waveguide each have a concavity oriented in the same direction.

The present disclosure also includes an optical communications system that comprises a transmitter, a receiver, and an optical communications channel coupled between the transmitter and receiver. The transmitter comprises a wavelength multiplexer that includes a plurality of interleavers. Each of the plurality of interleavers comprises any embodiment Mach-Zehnder interferometer disclosed herein.

It is to be understood that both the foregoing general description and the following detailed description are exemplary and explanatory only and are not restrictive of the invention, as claimed.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Figure 1:
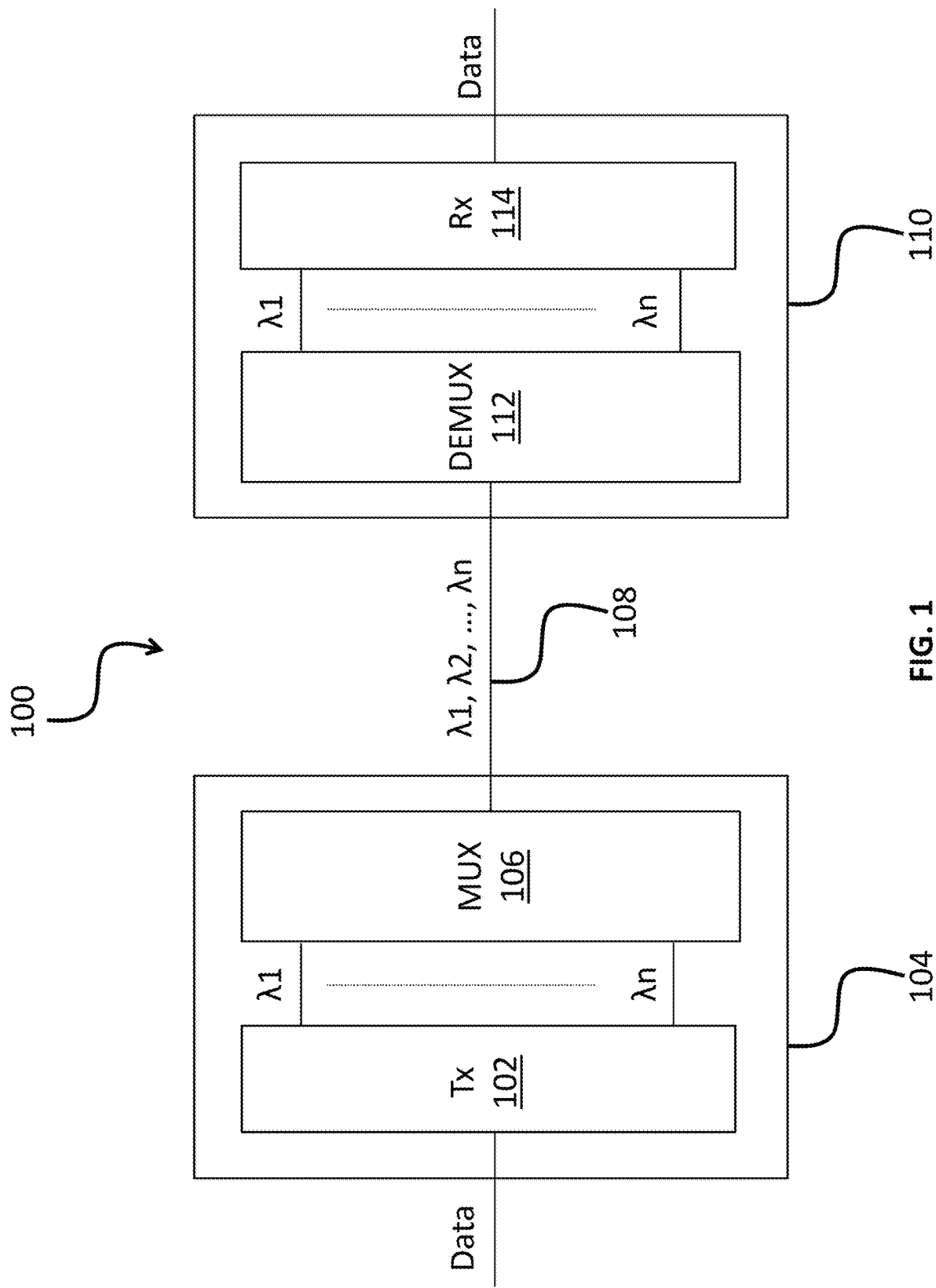
FIG. 1 illustrates a block diagram of an optical communication system consistent with the present disclosure.

FIG. 1 illustrates an optical link or optical communication system 100 according to an embodiment of the present disclosure. Optical communication system 100 includes a transmitter block 102 provided in a transmit node 104. The transmitter block 102 receives a data or information stream (labeled "Data" in FIG. 1). The transmitter block 102 is configured to modulate a plurality of optical wavelengths $\lambda 1$ to $\lambda n$ based on the received data stream, and the plurality of optical wavelengths $\lambda 1$ to $\lambda n$ are provided to a combiner or multiplexer 106. Each wavelength of the plurality of optical wavelengths $\lambda 1$ to $\lambda n$ is different from other wavelengths of the plurality of optical wavelengths $\lambda 1$ to $\lambda n$.

The multiplexer 106—which may include one or more interleavers implemented using one or more interferometers (e.g., MZ interferometers), as discussed in further detail below—combines the plurality of optical wavelengths $\lambda 1$ to $\lambda n$ into a wavelength division multiplexed (WDM) signal that is output onto optical communication path 108. Optical communication path 108 may include one or more segments of optical fiber and optical amplifiers, for example, to optically amplify or boost the power of the transmitted optical signals.

As further shown in FIG. 1, a receive node 110 is provided, which includes an optical decombiner or demultiplexer 112. The multiplexer 106 may have an architecture or structure that is complementary to the demultiplexer 112. The demultiplexer 112 deinterleaves the WDM signal according to the plurality of optical wavelengths $\lambda 1$ to $\lambda n$, which are provided to a receiver block 114. The receiver block demodulates the plurality of optical wavelengths $\lambda 1$ to $\lambda n$ to reconstruct a copy of data or information stream "Data." It is understood that the transmitter block 102 may have an architecture or structure that is complementary to the receiver block 114.

Figure 2:
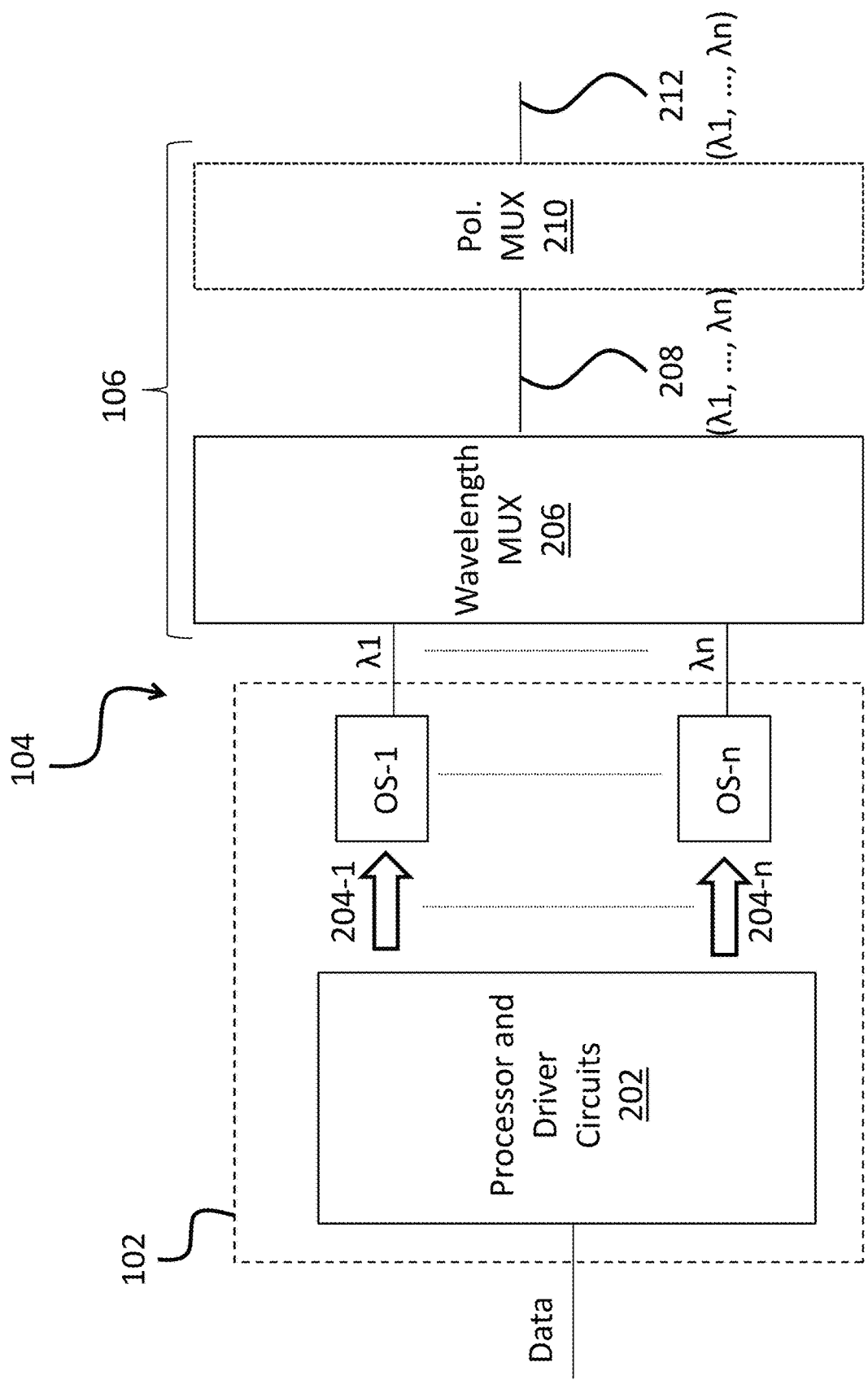
FIG. 2 illustrates a transmit node of the optical communication system of FIG. 1.

The transmit node 104 is shown in greater detail in FIG. 2. Transmitter block 102 may include a processor (such as a digital signal processor) and driver circuits 202 that receive the data or information stream. Circuitry 202, in turn, supplies corresponding outputs or electrical drive signals 204-1 to 204-$n$, based on the data stream, to optical sources OS-1 to OS-n provided on a substrate of a photonic integrated circuit (PIC). The substrate of the PIC may include indium phosphide or other semiconductor materials, such as Group III-V semiconductor materials. Each of the optical sources OS-1 to OS-n may include a laser diode configured to emit an optical signal of a given wavelength among the plurality of wavelengths $\lambda 1$ to $\lambda n$. Each of optical sources OS-1 to OS-n supplies a respective modulated optical signal having a respective wavelength X1 to $\lambda n$ to the multiplexer 106 in response to its corresponding drive signal 204-1 to 204-$n$.

The multiplexer 106 may include a wavelength multiplexing circuitry 206 and an optional polarizing multiplexing circuit 208. The optical signals of wavelengths $\lambda 1$ to $\lambda n$ are multiplexed by wavelength multiplexing circuitry 206 into a WDM output 208. In embodiments where the multiplexer 106 also includes the polarizing multiplexing circuit 210, the WDM output 208 is provided to polarizing multiplexing circuit 210, including, for example, a first polarization maintaining optical fiber and a second polarization maintaining optical fiber. As an example, the WDM output 208 may have a transverse electric (TE) polarization and may be supplied to the first polarization maintaining optical fiber of the polarizing multiplexing circuit 210, such that the polarization of each optical signal exiting the first polarization maintaining optical fiber has the TE polarization. The WDM output 208 may also be provided to the second polarization maintaining optical fiber of the polarizing multiplexing circuit 210. The second polarization maintaining optical fiber may be twisted in such a way that the polarization of each optical signal entering the second polarization maintaining fiber is rotated, for example, by 90 degrees. Accordingly, each optical signal exiting the second polarization maintaining optical fiber has a transverse magnetic (TM) polarization. Polarizing multiplexing circuit 210, in turn, combines the optical outputs exiting from the first and second polarization maintaining optical fibers to provide a polarization multiplexed WDM optical signal 212.

In some embodiments, the wavelength multiplexing circuitry 206 may be integrated on the same substrate that supports the optical sources OS-1 to OS-n. However, it is noted that optical sources OS-1 to OS-n, as well as wavelength multiplexing circuitry 206, may be provided as discrete components, as opposed to being integrated onto the same substrate of a PIC. Even further, selected components may be provided on a first substrate while others may be provided on one or more additional substrates in a hybrid scheme in which the components are neither integrated onto one substrate nor provided as discrete devices.

Figure 3:
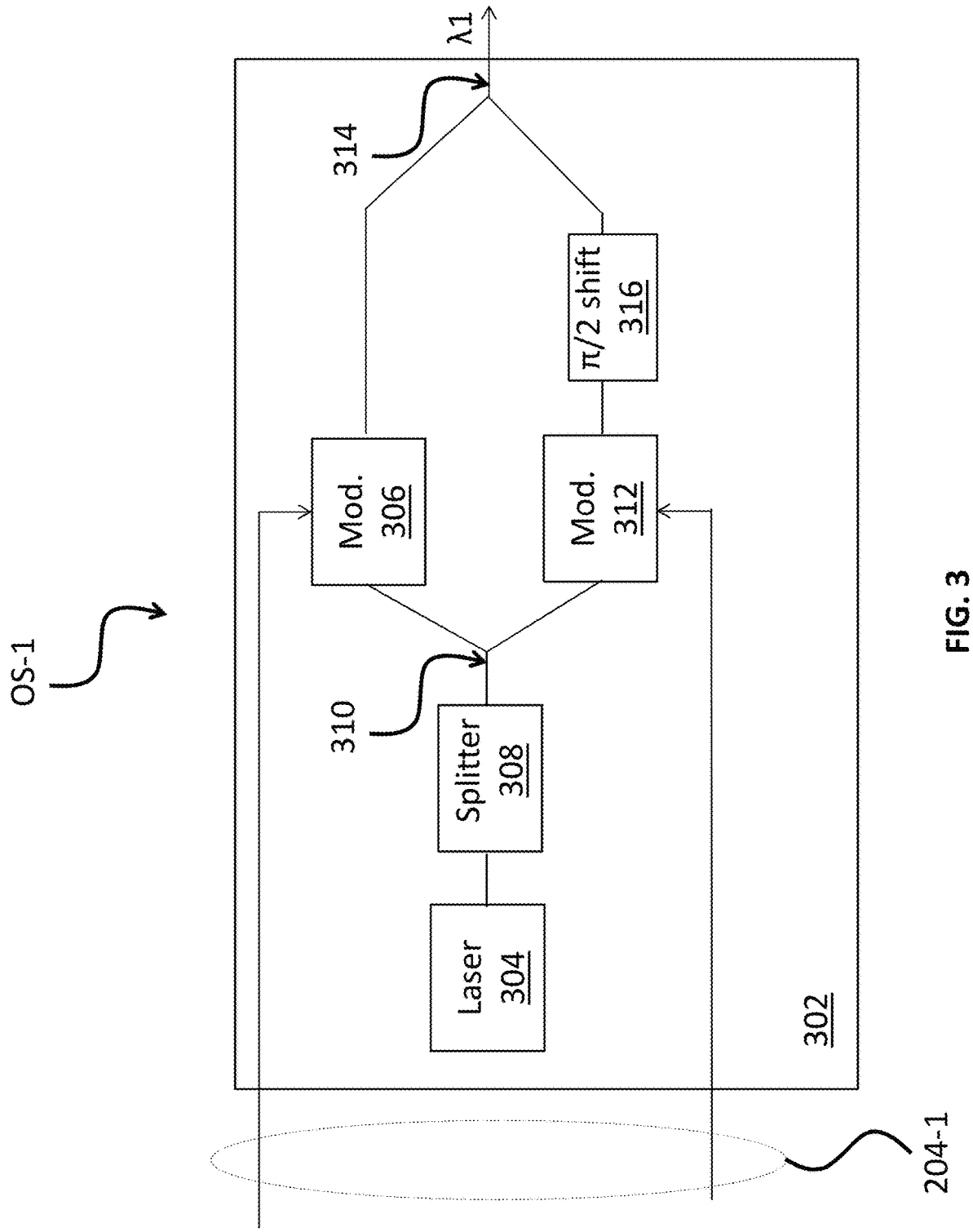
FIG. 3 illustrates an optical source of the transmit node of FIG. 2.

FIG. 3 illustrates transmitter or optical source OS-1 in greater detail. It is understood that remaining optical sources OS-2 to OS-n have the same or similar structure as optical source OS-1. Optical source OS-1 may be provided on substrate 302 of a PIC and may include a laser 304, such as a distributed feedback laser (DFB), which supplies light to modulators 306, 312. Alternatively, other lasers may be provided. Laser 304 may be tunable or may be configured to provide optical signals having a substantially fixed wavelength. For example, laser 304 of FIG. 3 may output continuous wave (CW) light at wavelength $\lambda 1$ to a splitter 308 (e.g., a 3 dB splitter). Typically, the waveguides used to connect the various components of optical source OS-1 may be polarization dependent. The output of splitter 308 supplies the CW light to branching unit 310. A first output of branching unit 310 is coupled to modulator 306, while a second output of branching unit 310 is coupled to modulator 312. Modulators 306 and 312 may be, for example, Mach Zehnder (MZ) modulators. MZ modulators 306, 312 may have a traveling wave or lumped configuration. Each of the MZ modulators receives CW light from splitter 308 and splits the light between its two arms or paths according to methods known in the art.

Typically, an applied electric field in one or both paths or arms of an MZ modulator may create a change in the refractive index within the arm(s). In one example, if the relative phase between the signals traveling through each path is 180° out of phase, destructive interference results and the signal is blocked. If the signals traveling through each path are in phase, the light may pass through the device and modulated with an associated data stream. The applied electric field, through application of biases or voltages at electrodes (not shown in FIG. 3), may also cause changes in the refractive index such that a phase, as well as the amplitude, of light output from the MZ modulator is shifted or changed relative to light input to the MZ modulator. Thus, appropriate changes in the electric field can cause changes in phase of the light output from the MZ modulator, such that the light output from the modulator complies with phase modulation format, such as QPSK, BPSK or another phase modulation format.

Each of the MZ modulators 306, 312 is driven with data signals or drive signals associated with drive signal 204-1, for example. The CW light supplied to MZ modulator 306 via laser 304 and splitter 308 is modulated in accordance with one such drive signal from drive signal 204-1. The modulated optical signal from MZ modulator 306 is supplied to a first input of coupling unit 314. Similarly, other drive signals of drive signal 204-1 drive MZ modulator 312. The CW light supplied to MZ modulator 312 via laser 304 and splitter 308 is modulated in accordance with the other drive signals of drive signal 204-1. The modulated optical signal output from MZ modulator 312 is supplied to phase shifter 316, which shifts the phase of the signal by 90° (i.e., $\pi/2$ radians) to generate one of an in-phase (I) or quadrature (Q) components, which is supplied to a second input of the coupling unit 314. The modulated data signals from MZ modulator 306, which includes the other of the I and Q components, and from MZ modulator 312 are supplied as optical signal $\lambda 1$ (see FIG. 2) to the wavelength multiplexing circuitry 206 via the coupling unit 314. In some embodiments, splitter 308 may be omitted and laser 304 may be configured to provide CW light to each of the MZ modulators 306, 312 via branching unit 310. Such embodiments may provide sufficient power to the respective MZ modulators with less power than that experienced when splitter 308 is used.

Figure 4:
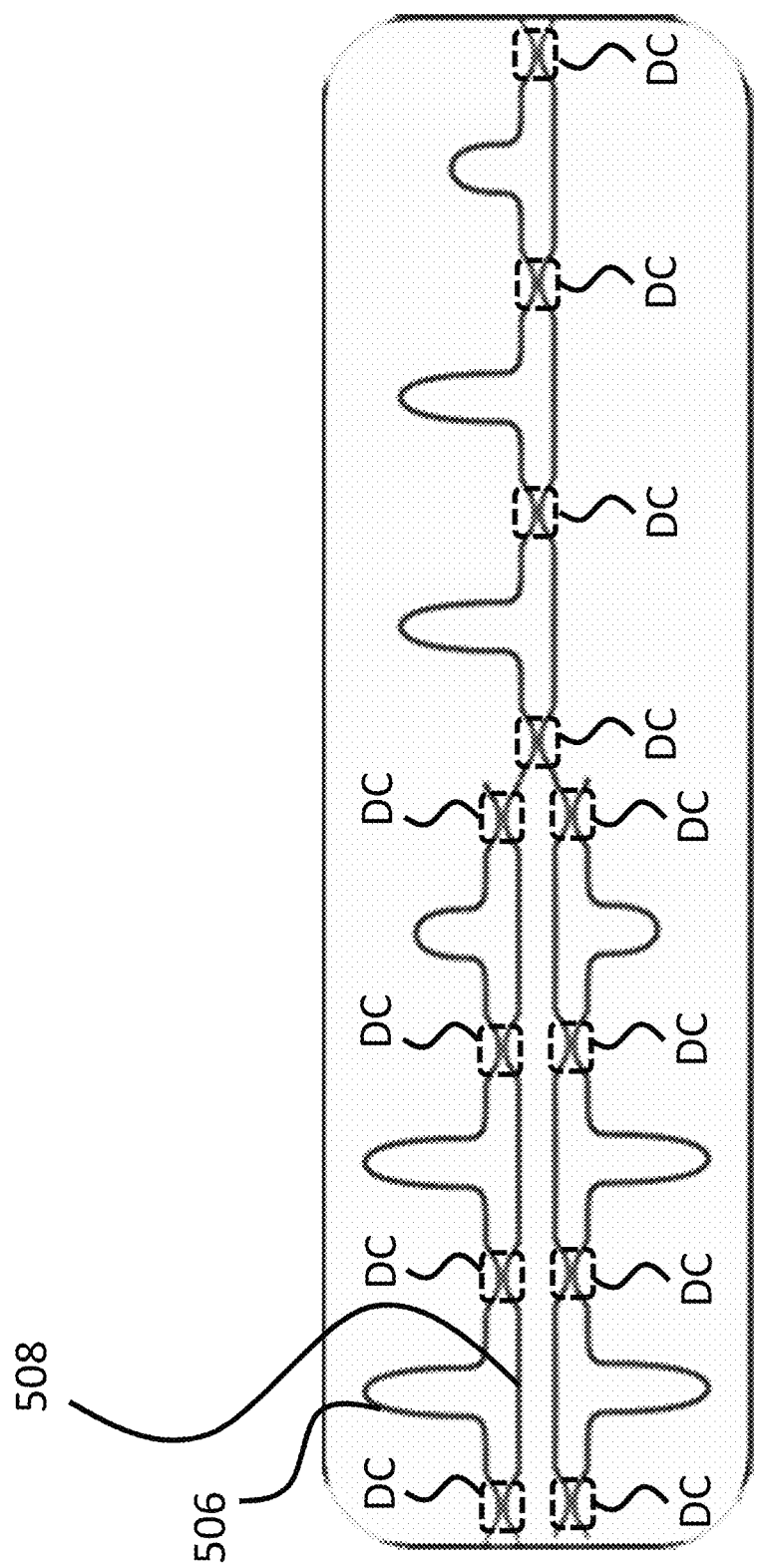
FIG. 4 illustrates a wavelength multiplexer implemented using a plurality of interleavers.

Wavelength multiplexing circuitry 206 and wavelength demultiplexing circuitry (e.g. included in the demultiplexer 112 in the optical communications system 100 of FIG. 1) may implemented using one or more interleavers and deinterleavers, respectively. Furthermore the interleaver or deinterleaver may include one or more MZ interferometers. As an example, FIG. 4 illustrates wavelength multiplexing circuitry 206 implemented using a plurality of interleavers, each of which includes one or more MZ interferometers.

Figure 5:
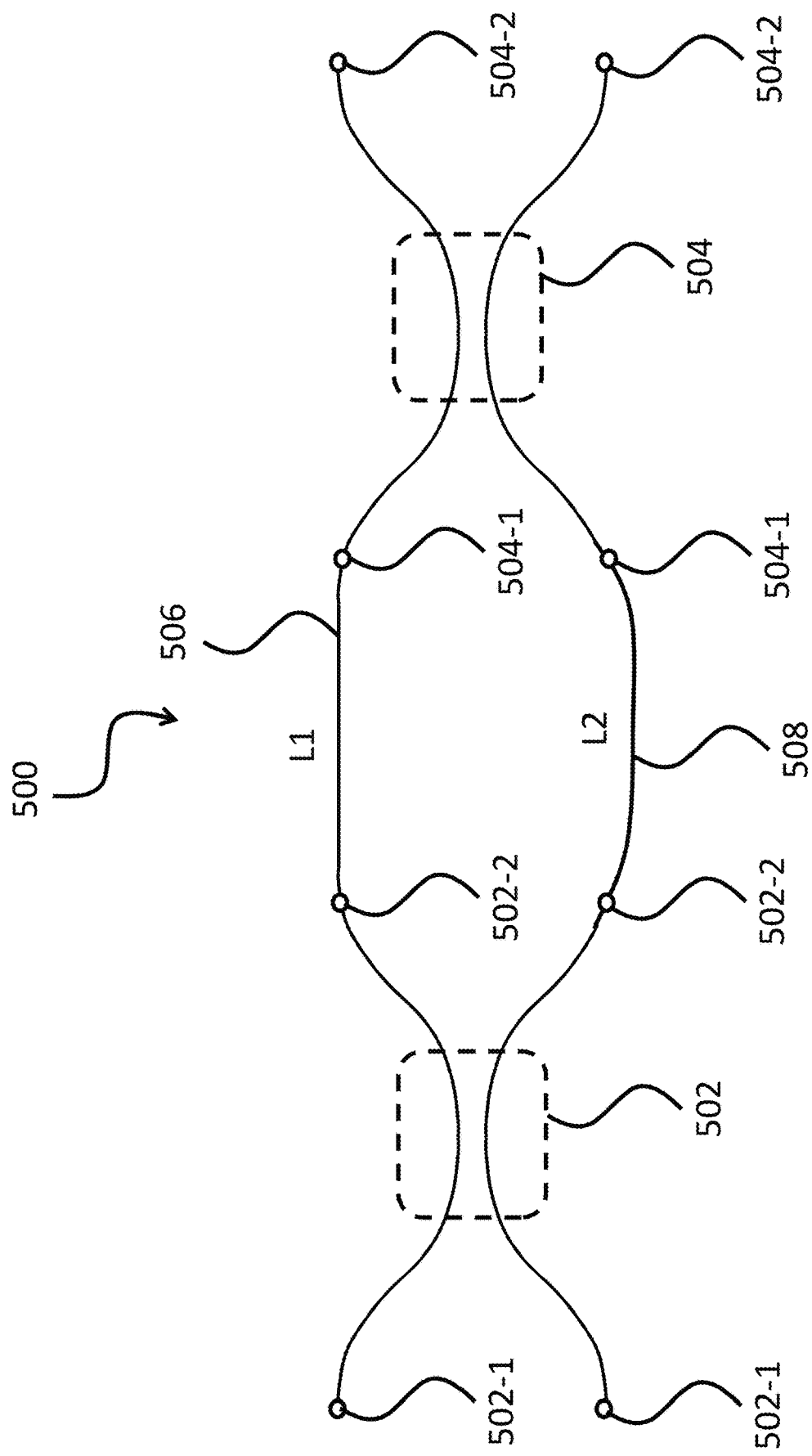
FIG. 5 illustrates the general architecture of a Mach-Zehnder interferometer.

In general, as illustrated in FIG. 5, an MZ interferometer 500 includes two directional couplers 502, 504. The directional couplers of the MZ interferometers of FIG. 4 are indicated as reference "DC" in FIG. 4. First directional coupler 502 includes a pair of input ports 502-1 and a pair of output ports 502-2. Second directional coupler 504 includes a pair of input ports 504-1 and a pair of output ports 504-2. A first path 506 (e.g., implemented using an optical waveguide) connects one port of the pair of output ports 502-2 of the first directional coupler 502 to one port of the pair of input ports 504-1 of the second directional coupler 504. A second path 508 (e.g., implemented using another optical waveguide) connects the other port of the pair of output ports 502-2 of the first directional coupler 502 to the other port of the pair of input ports 504-1 of the second directional coupler 504.

The paths 506, 508 introduce a phase shift to the respective optical signals travelling within the respective paths 506, 508. Consequently, each of the paths 506, 508 acts as a phase shifter between the pair of output ports 502-2 of the first directional coupler 502 and the pair of input ports 504-1 of the second directional coupler 504. Furthermore, a phase difference between the two paths 506, 508 is introduced by increasing one of the path lengths with respect to the other. The difference in path lengths between the two paths 506, 508 is illustrated as being more pronounced in the example shown in FIG. 4. The path length of path 506 is illustrated as L1 in FIG. 5, while the path length of path 508 is illustrated as L2. In general, the path length of a given path may be the length of the optical waveguide that connects a given port of the pair of output port 502-2 of the first directional coupler 502 to the corresponding port of the pair of input port 504-1 of the second directional coupler 504. The directional couplers 502, 504 are wavelength sensitive. Hence, the characteristics of the MZ interferometer 500 may be determined by a 3 dB crossover wavelength of the couplers 502, 504, the coupling strength, and a path difference $\Delta L$ (i.e., L1–L2). Furthermore, by appropriately selecting the path difference $\Delta L$ between the two paths 506, 508 according to methods known in the art, wavelength multiplexing/demultiplexing can be achieved.

As mentioned above, the characteristics of the MZ interferometer 500 may be determined by the 3 dB crossover wavelength of the couplers 502, 504, the coupling strength, and the path difference $\Delta L$. However, due to process variations during the fabrication of the couplers 502, 504, phase errors may be introduced by the wavelength multiplexing circuitry 206 and/or wavelength demultiplexer used in the demultiplexer 112 of FIG. 1. Thus, to ensure performance repeatability and uniformity at the wafer level of devices that are used in optical communication system 100, such process-induced phase errors should be reduced or substantially eliminated. However, standard design and control of the processes used to manufacture/fabricate the couplers 502, 504 do not reduce such phase errors.

In response to these observations, some have proposed reducing fabrication tolerances (and thus reduce phase errors) through variation of the waveguide width geometry. However, a drawback of such an approach is an overall increase in the footprint of the interleavers used in wavelength multiplexers and demultiplexers. Yet another proposal calls for an approach that has a dependence on wavelength. However, such a solution is not optimal for large bandwidth applications like coarse WDM, only counteracts uniform variability of waveguide width on the whole filter, and also results in a large footprint.

Embodiments disclosed herein provide an architecture for an MZ device (e.g., an MZ interferometer) that provides several advantages, including being compact (e.g. occupies an area much smaller compared to known solutions), robust (e.g. reduced phase errors compared to known solutions), and having greater yield (e.g. reduced process-induced phase errors compared to known solutions, thus giving higher matching to given specifications).

Figure 6:
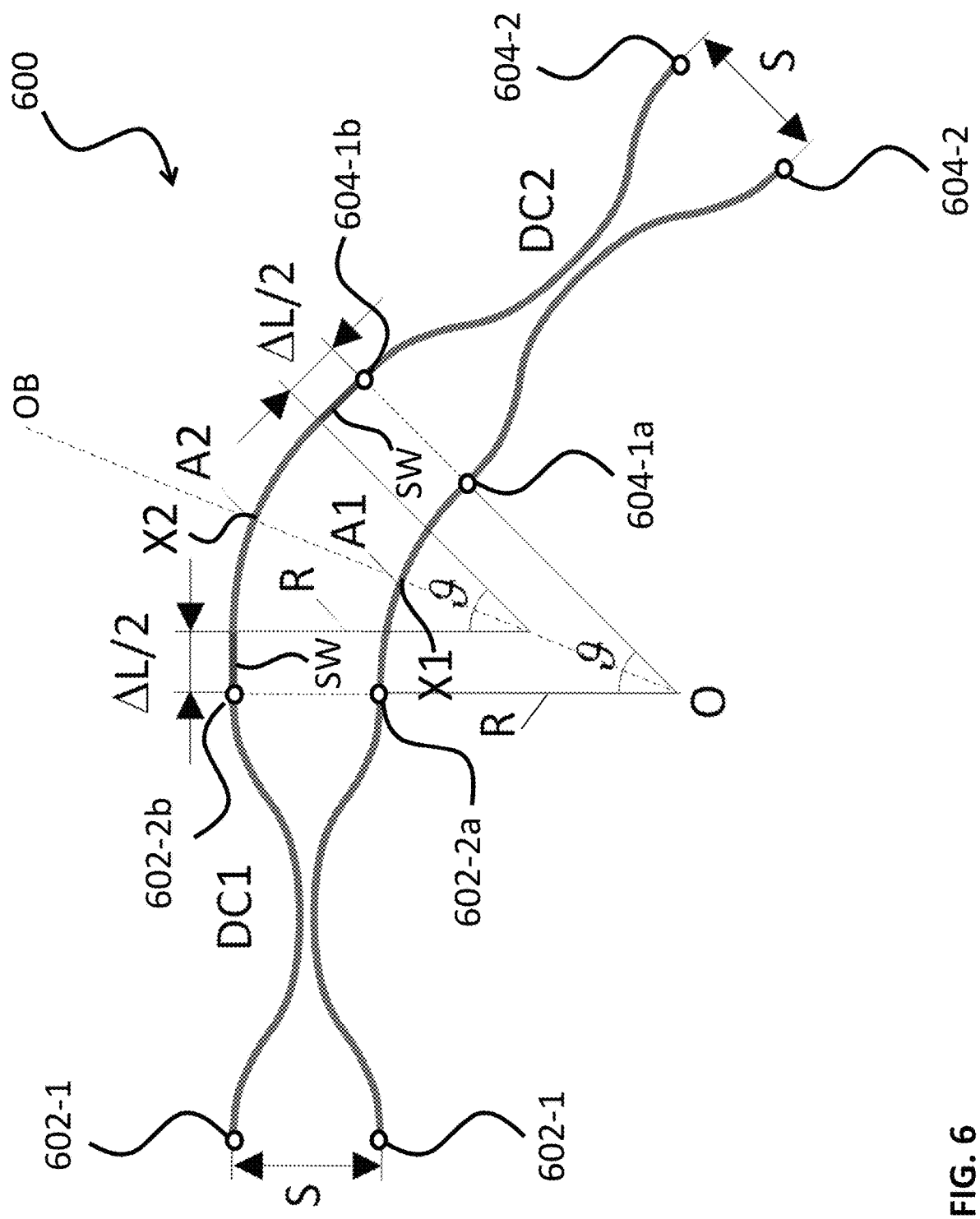
FIGS. 6 to 13 illustrate various Mach-Zehnder interferometers, in accordance with various embodiments of this disclosure.

FIG. 6 illustrates a Mach-Zehnder interferometer 600, in accordance with an embodiment of this disclosure. The MZ interferometer 600 of FIG. 6 exhibits the above-identified advantages. As shown in FIG. 6, the MZ interferometer includes a pair of directional couplers DC1, DC2. A first directional coupler DC1 includes a pair of input ports 602-1 that a separated by a distance S (referred to in this disclosure as separation S). The first directional coupler DC1 also includes a pair of output ports 602-2a, 602-2b, where the two ports 602-2a and 602-2b are also spaced apart by separation S. A second directional coupler DC2 includes a pair of input ports 604-1a, 604-1b and a pair of output ports 604-2. As with first directional coupler DC1, each of the pair of input ports 604-1a, 604-1b and the pair of output ports 604-2 of the second directional coupler DC2 have the separation S.

A first curved path is used as an interconnection between one port 602-2a of the pair of output ports 602-2a, 602-2b of the first directional coupler DC1 and one port 604-1a of the pair of input ports 604-1a, 604-1b of the second directional coupler DC2. The first curved path is implemented by an arched single-mode waveguide A1 having an angle of curvature and radius R of curvature taken from a given point O. The first curved path forms an inner arc relative to a second curved path that interconnects the other output port 602-2b of the first directional coupler DC1 and the other input port 604-1b of the second directional coupler DC2.

The second curved path includes an arched single-mode waveguide A2 that is identical to the arched single-mode waveguide A1 used in the first curved path. The concavities of the two identical arched waveguides A1 and A1 are facing the same direction, e.g., so that the close proximity is reached. As an example, the lengths of the arched single-mode waveguides A1 and A2 are identical. For a desired path difference ΔL between the first curved path and the second curved path, the second curved path includes two identical straight single-mode waveguides SW disposed on either side of the arched single-mode waveguide A2. Each of the two identical straight single-mode waveguides SW has a length ΔL/2, thereby causing the path difference between the first curved path and the second curved path to be ΔL.

As seen in FIG. 6, there is a symmetry in the proposed architecture about the bisector OB of the angle of curvature ϑ. Consequently, the proposed architecture is one in which the path difference ΔL is a function of separation S, radius R of curvature, and angle of curvature ϑ. The angle bisector OB intersects the first curved path at point X1 and the second curved path at point X2. A distance separating points X1 and X2, as measured along the angle bisector OB, is indicative of the distance between the two arms of the MZ interferometer. The close proximity of the two arms of the interferometer (e.g., as indicated by the distance separating points X1 and X2) ensures that process-induced phase errors are reduced. I suggest to say that the concavities of the two identical arched waveguides are facing the same direction, in this way the close proximity is reached.

Figure 7:
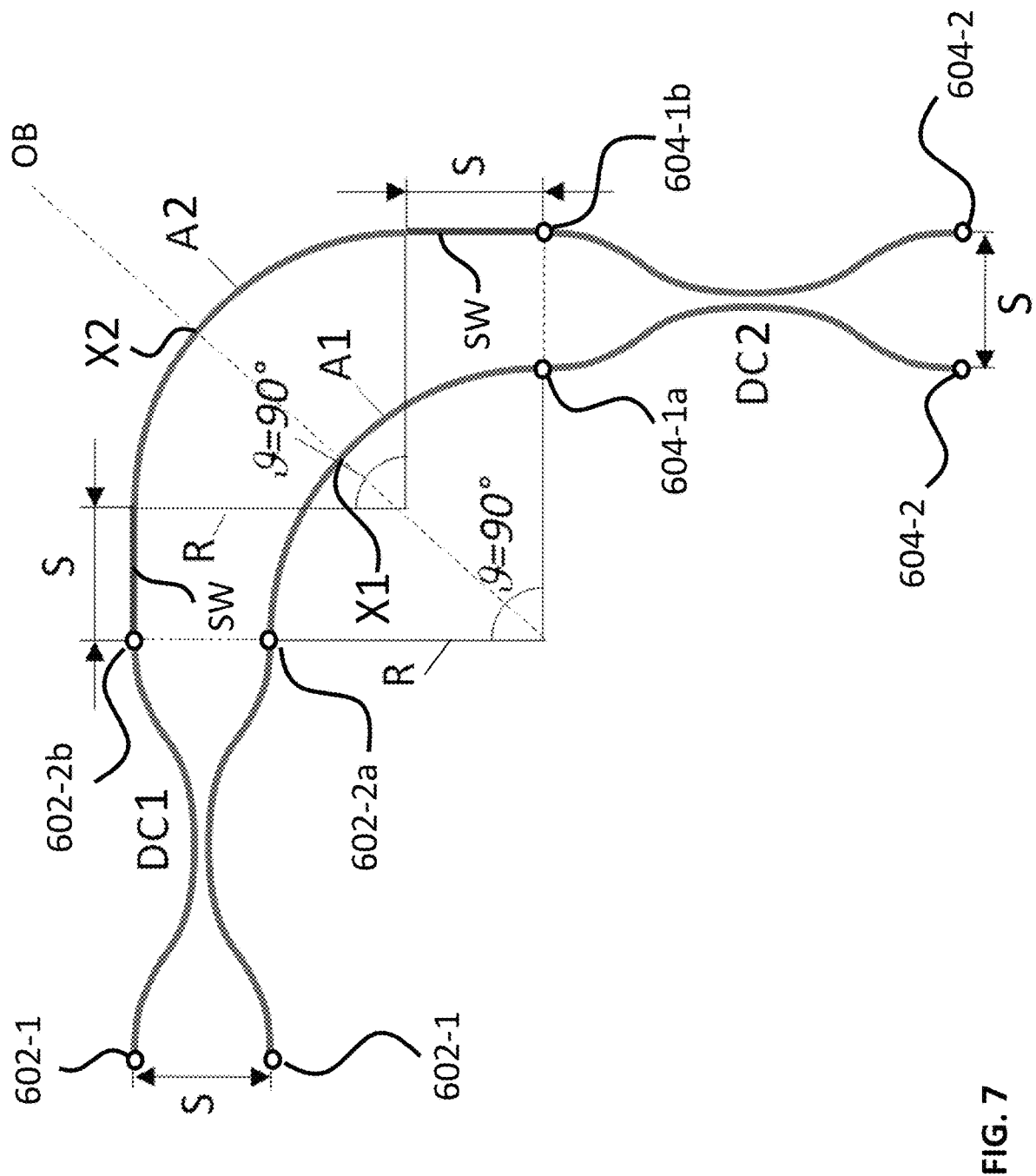

FIG. 7 shows an embodiment where the desired path difference ΔL is equal to twice the separation S and where the angle of curvature ϑ is equal to 90 degrees. As seen in FIG. 7, the two identical straight single-mode waveguides SW disposed on either side of the arched single-mode waveguide A2 has length S, thereby causing the path difference between the first curved path and the second curved path to be 2S.

Figure 8:
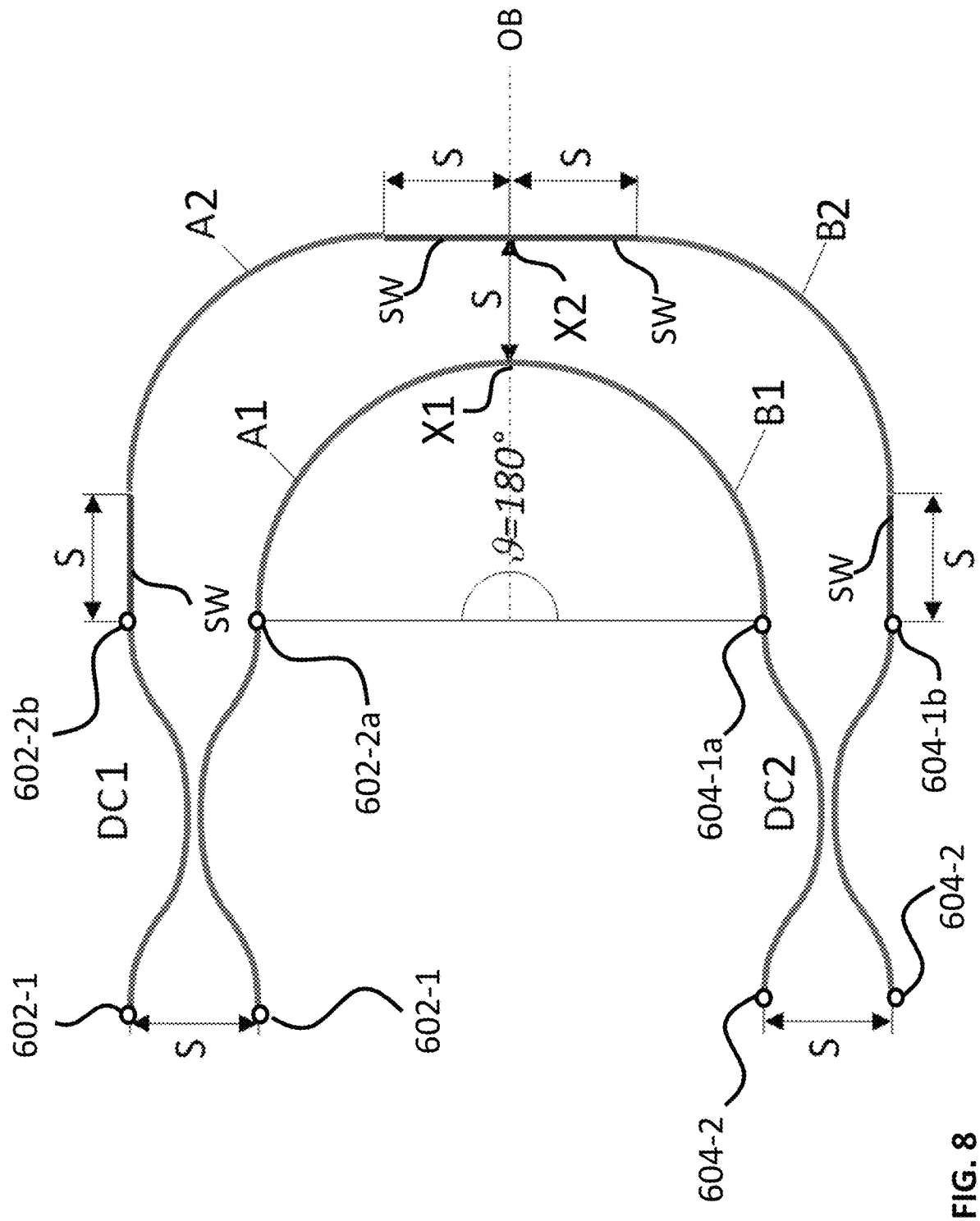

FIG. 8 shows an embodiment where the desired path difference ΔL is equal to four times the separation S and where the angle of curvature ϑ is equal to 180 degrees. As seen in the embodiment of FIG. 8, there is a symmetry in the proposed architecture about the bisector OB of the angle of curvature ϑ. The first curved path has a first arched single-mode waveguide A1, which is identical to the arched single-mode waveguide A1 of FIG. 7. The second curved path has a first arched single-mode waveguide A2, which is identical to the arched single-mode waveguide A2 of FIG. 7. Two identical straight single-mode waveguides SW are disposed on either side of the first arched single-mode waveguide A2 of the second curved path. Each of the two straight single-mode waveguides SW has length S. Consequently, the design of the first curved path from output port 602-2a of the first directional coupler DC1 to the angle bisector OB is identical to the design of the first curved path in FIG. 7.

Similarly, the design of the second curved path from output port 602-2b of the first directional coupler DC1 to the angle bisector OB is identical to the design of the second curved path in FIG. 7. In the example of FIG. 8, a distance separating points X1 and X2, as measured along the angle bisector OB, is the separation S. The first curved path has a second arched single-mode waveguide B1, which is identical to the arched single-mode waveguide A1. The second arched single-mode waveguide B1 connects point X1 and the input port 604-1a of the second directional coupler DC2. The second curved path has a second arched single-mode waveguide B2, which is identical to the arched single-mode waveguide B1 of the first curved path.

Two identical straight single-mode waveguides SW are disposed on either side of the second arched single-mode waveguide B2 of the second curved path. The path difference between the first curved path and the second curved path of the example of FIG. 8 is 4S. As with the examples given above, the close proximity of the two arms of the interferometer (e.g. as indicated by the distance separating points X1 and X2) ensures that process-induced phase errors are reduced.

Figure 9:
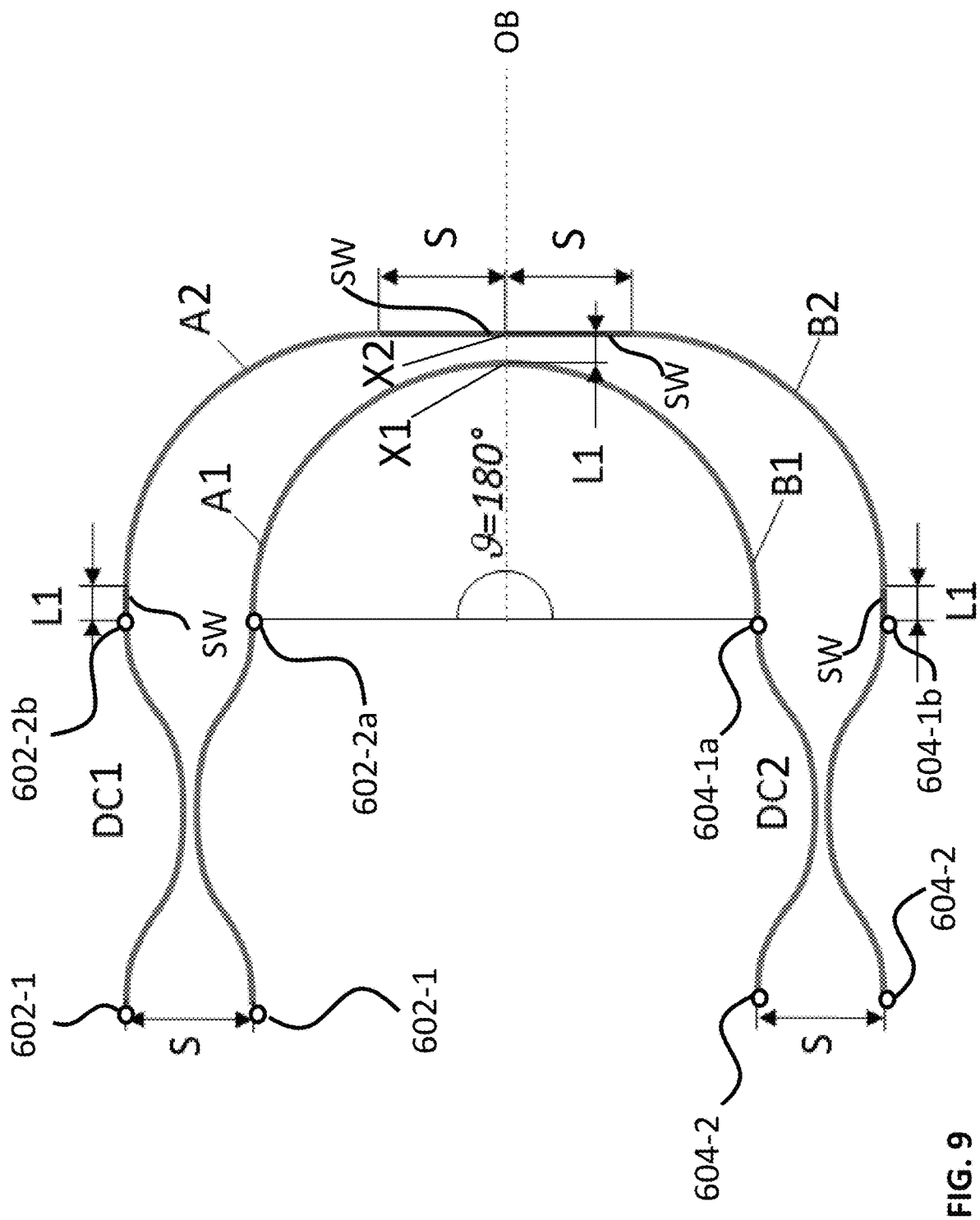

FIG. 9 shows an embodiment where the straight single-mode waveguide SW in closest proximity to the first directional coupler DC1 has some arbitrary path length L1. Similarly, the straight single-mode waveguide SW in closest proximity to the second directional coupler DC2 has the arbitrary path length L1. Each of the two straight single-mode waveguides SW in the middle of the second curved path still retains a path length that is equal to separation S. In this proposed architecture, the distance separating points X1 and X2, as measured along the angle bisector OB, is equal to the arbitrary path length L1. Consequently, in the embodiment of FIG. 9, the desired path difference ΔL is equal to twice the sum of separation S and arbitrary path length L1. As observed in FIG. 9, when arbitrary path length L1 is equal to separation S, the embodiment of FIG. 8 is obtained. Furthermore, the close proximity of the two arms of the interferometer (e.g. as indicated by the distance separating points X1 and X2) ensures that process-induced phase errors are reduced. In the example of FIG. 9, the desired path difference ΔL is equal to twice the value of the sum of the arbitrary path length L1 and the separation S, and where the angle of curvature ϑ is equal to 180 degrees.

Figure 10:
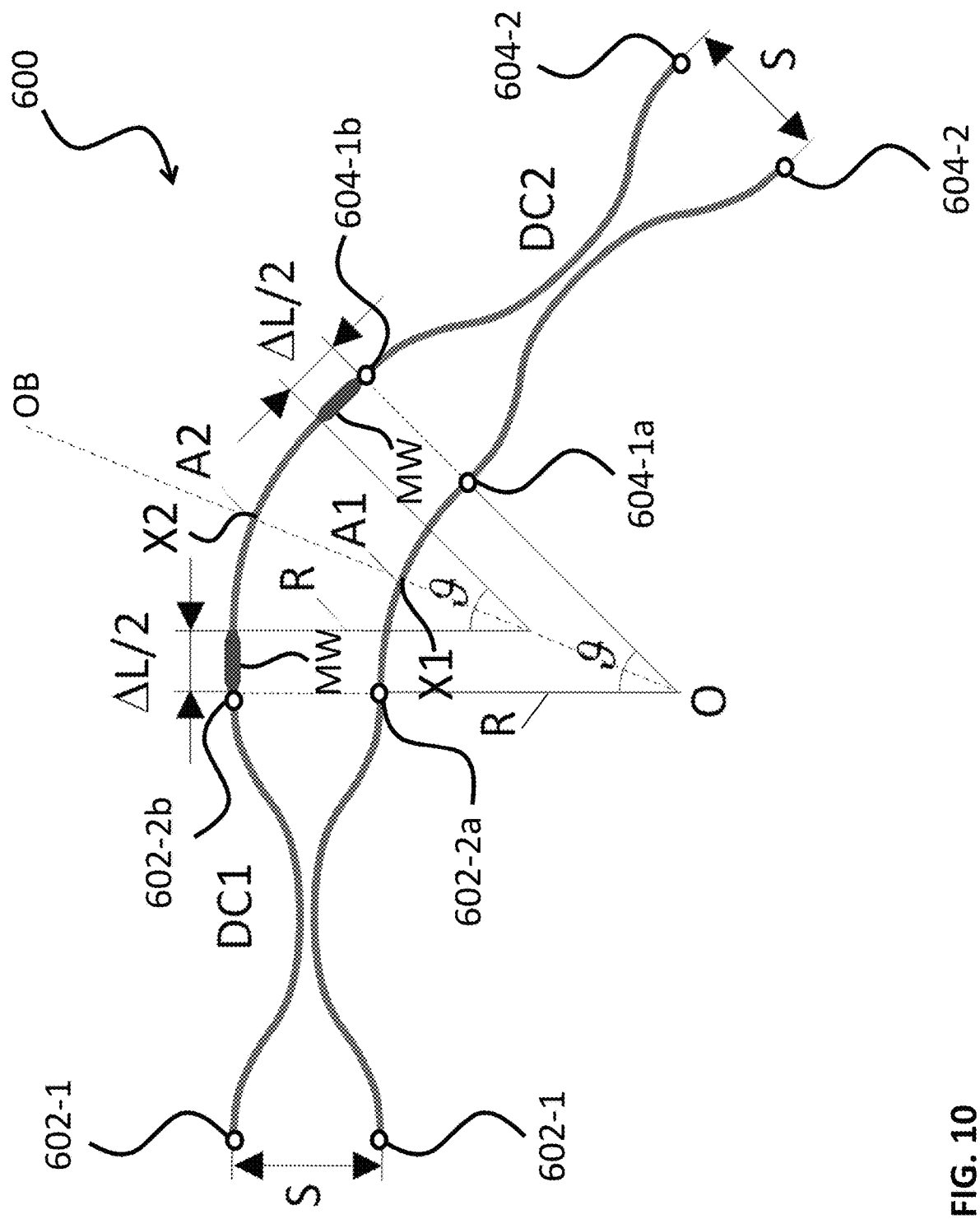
Figure 11:
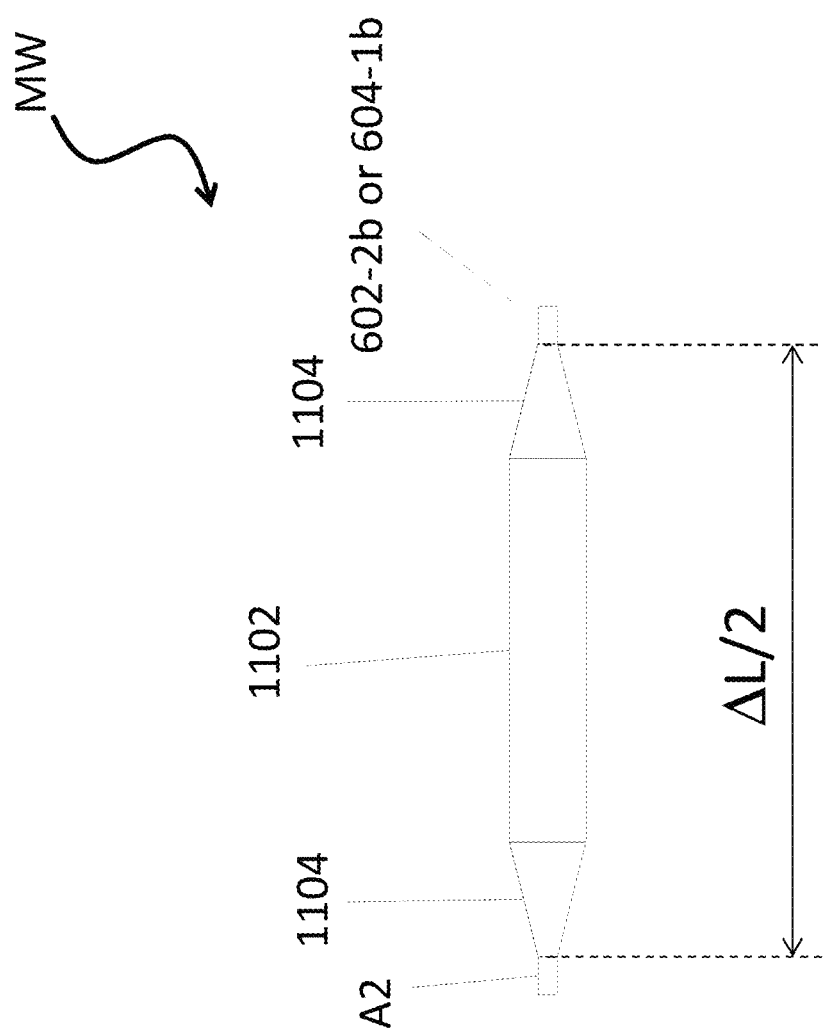

The first curved path and the second curved path in the examples discussed above include single-mode waveguides. However, it is noted that multi-mode waveguides may be used in the first curved path and the second curved path, where the coupling between a multi-mode waveguide and a single-mode waveguide is realized through a waveguide taper known in the art. For example, FIG. 10 shows an embodiment where each of the straight single-mode waveguides SW of FIG. 6 is replaced by a structure MW, which is shown in greater detail in FIG. 11.

The structure MW includes a straight multi-mode waveguide 1102 having waveguide tapers 1104 on either end thereof. The waveguide tapers 1104 serve to couple the straight multi-mode waveguide 1102 to the arched single-mode waveguide A2 and the single-mode waveguide at the output port 602-2b of the first directional coupler DC1 and/or the single-mode waveguide at the input port 604-1b of the second directional coupler DC2. As illustrated in FIG. 1i, the total length of the straight multi-mode waveguide 1102 and the two waveguide tapers 1104 are included in the length ΔL/2.

Figure 12:
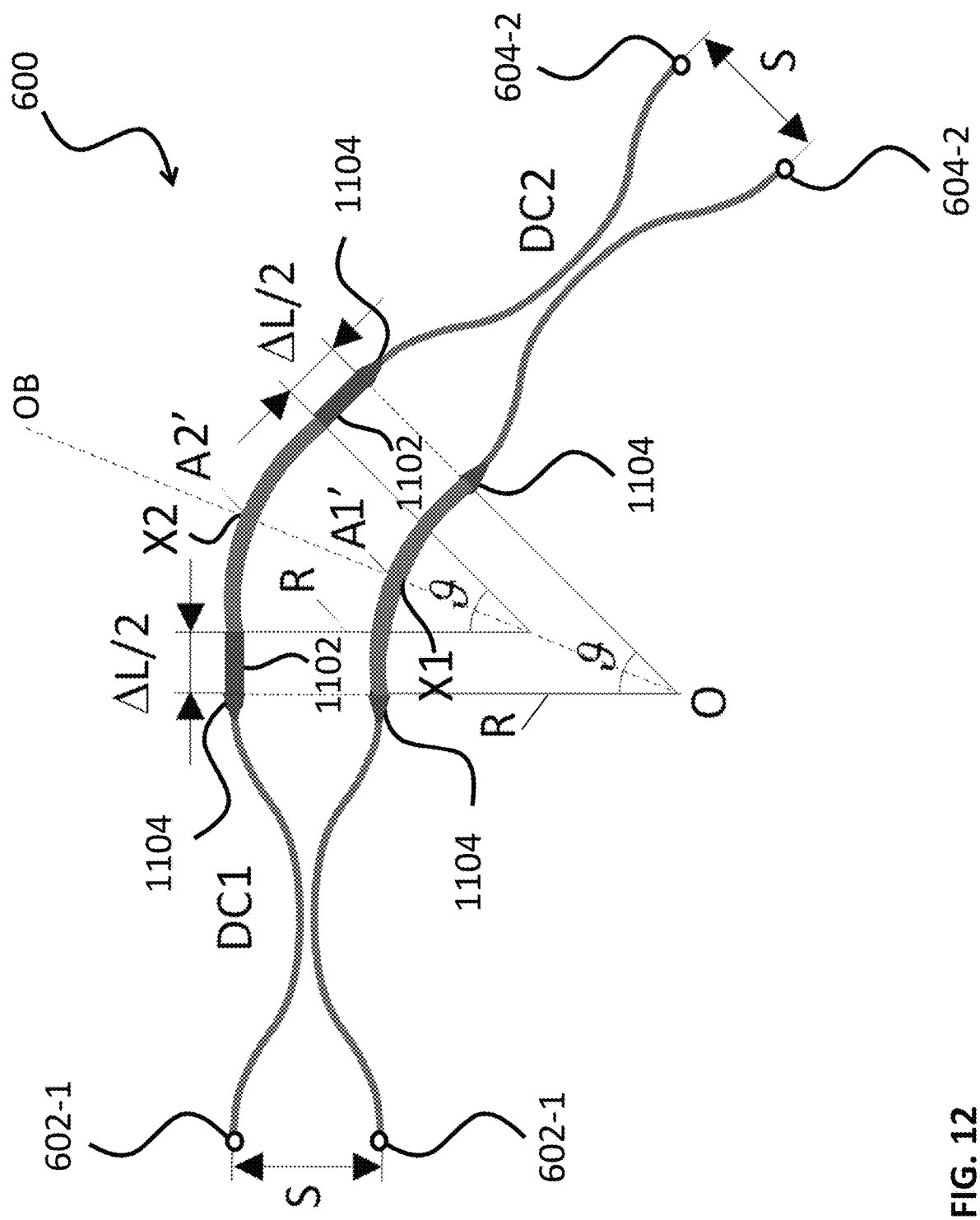
Figure 13:
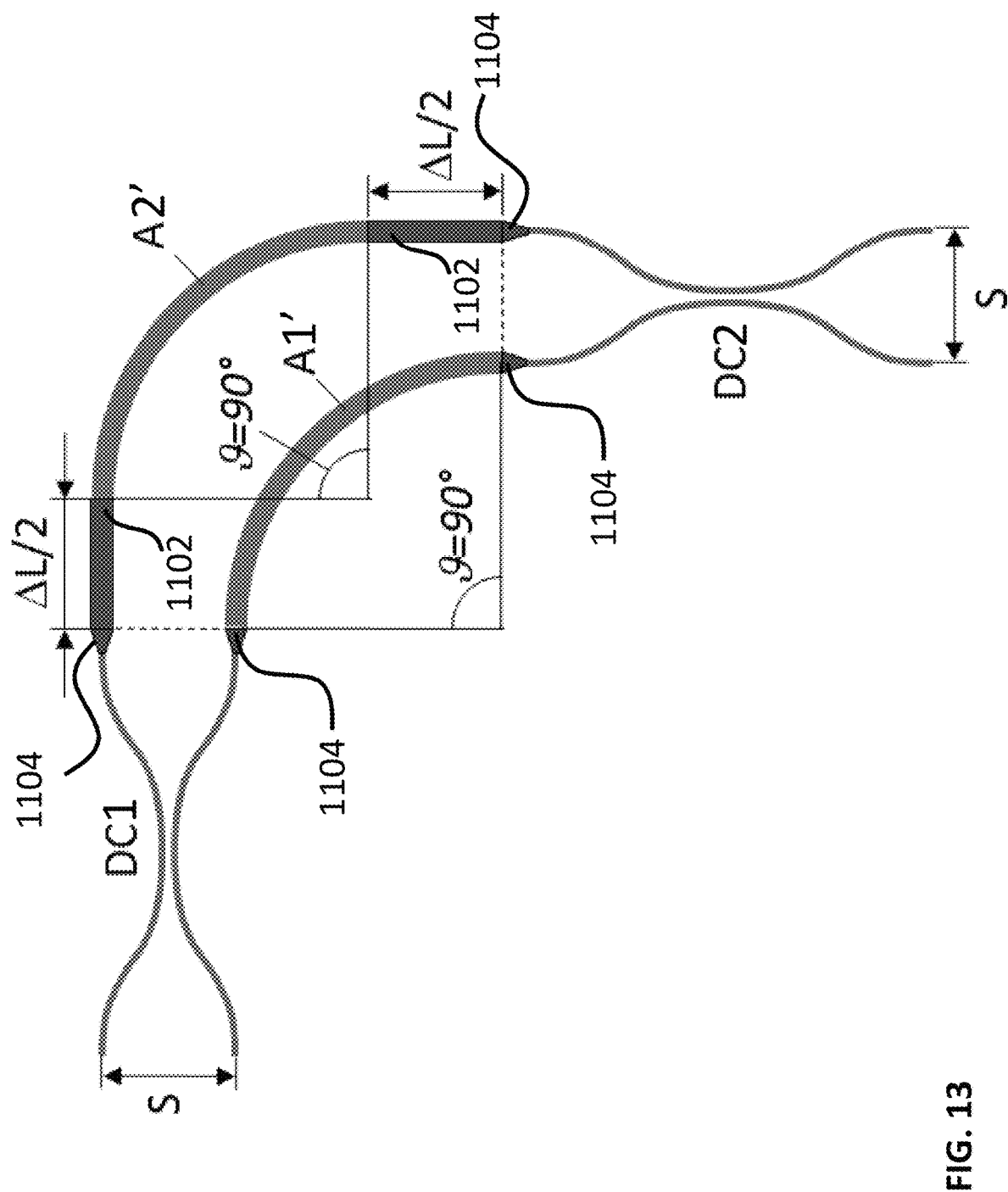

FIG. 12 shows another example where the arched single-mode waveguides A1 and A2 as well as the straight single-mode waveguides SW of FIG. 6 are replaced with multi-mode waveguides. For example, each of arched single-mode waveguides A1 and A2 are replaced by arched multi-mode waveguides A1' and A2', respectively. Furthermore, each of the straight single-mode waveguides SW of FIG. 6 is replaced by the straight multi-mode waveguide 1102. The length of each of the straight multi-mode waveguides 1102 is equal to the length $\Delta L/2$. In other words, the desired path difference is obtained with the two straight multi-mode waveguides 1102. FIG. 12 also shows that the coupling of a multi-mode waveguide to a single-mode waveguide is realized through the waveguide tapers 1104, which are the same in both arms, with two waveguide tapers 1104 being used for each path. FIG. 13 shows a specific example of the embodiment of FIG. 12, where the desired path difference $\Delta L$ is equal to twice the separation S and where the angle of curvature $\vartheta$ is equal to 90 degrees.

Figure 14A:
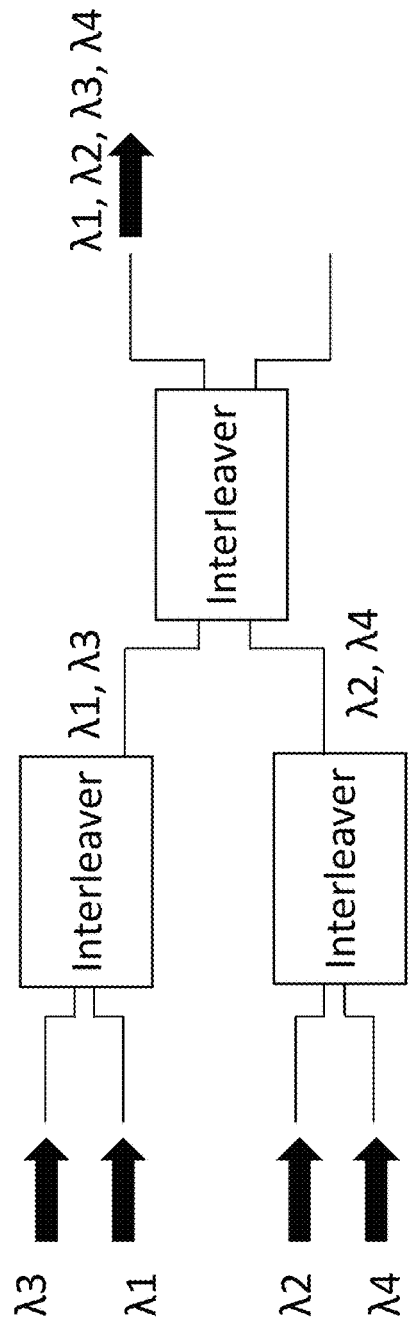
FIGS. 14A and 15A show general block diagrams of a four-channel interleaver-based wavelength multiplexing circuitry and an eight-channel interleaver-based wavelength multiplexing circuitry, respectively.
Figure 14B:
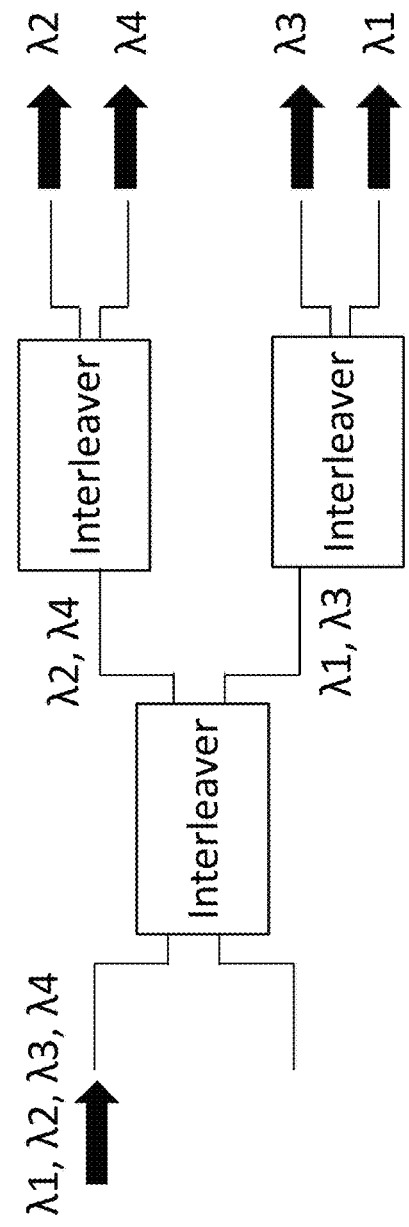
FIGS. 14B and 15B show general block diagrams of a four-channel interleaver-based wavelength demultiplexer and an eight-channel interleaver-based wavelength demultiplexer, respectively.
Figure 15A:
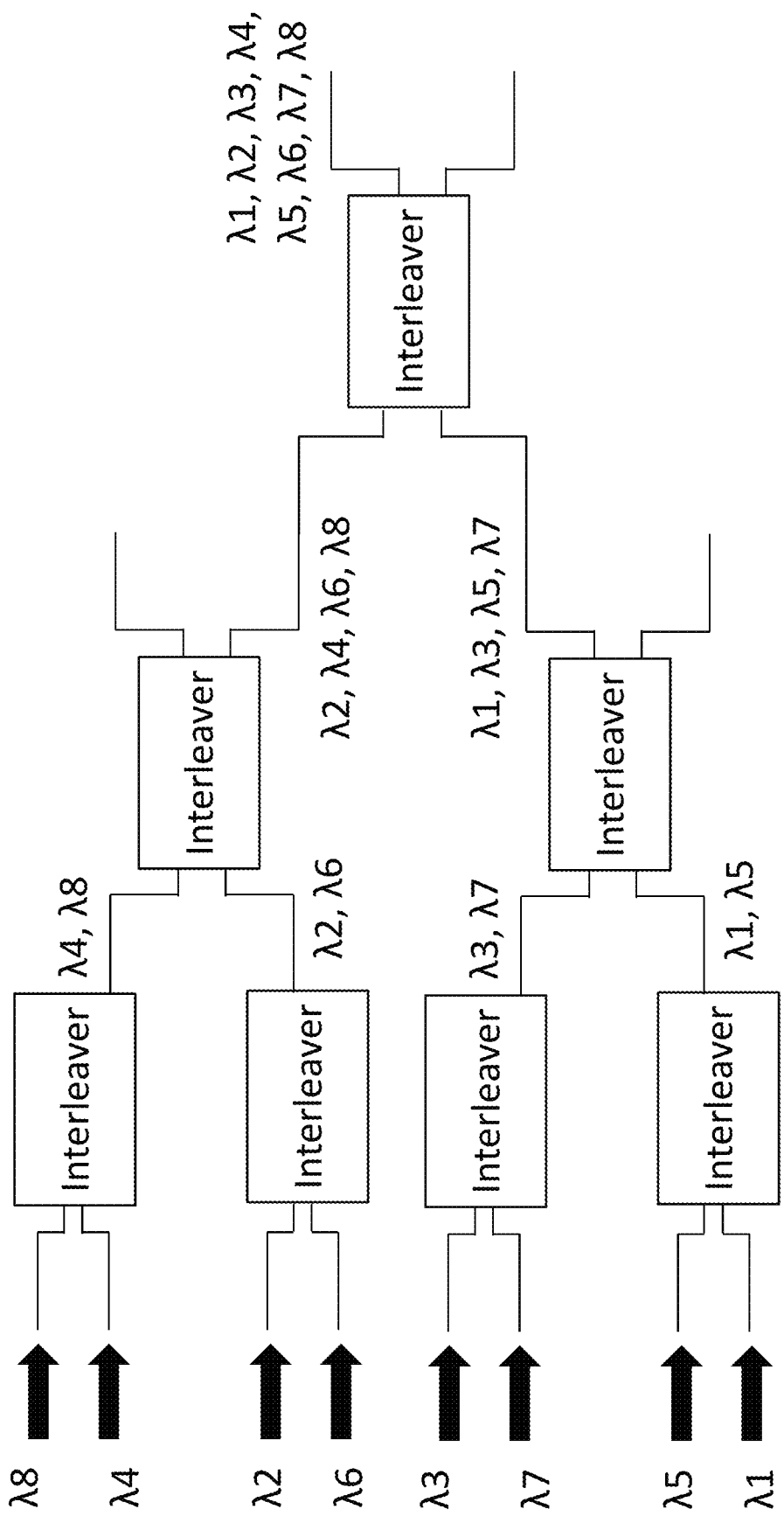
Figure 15B:
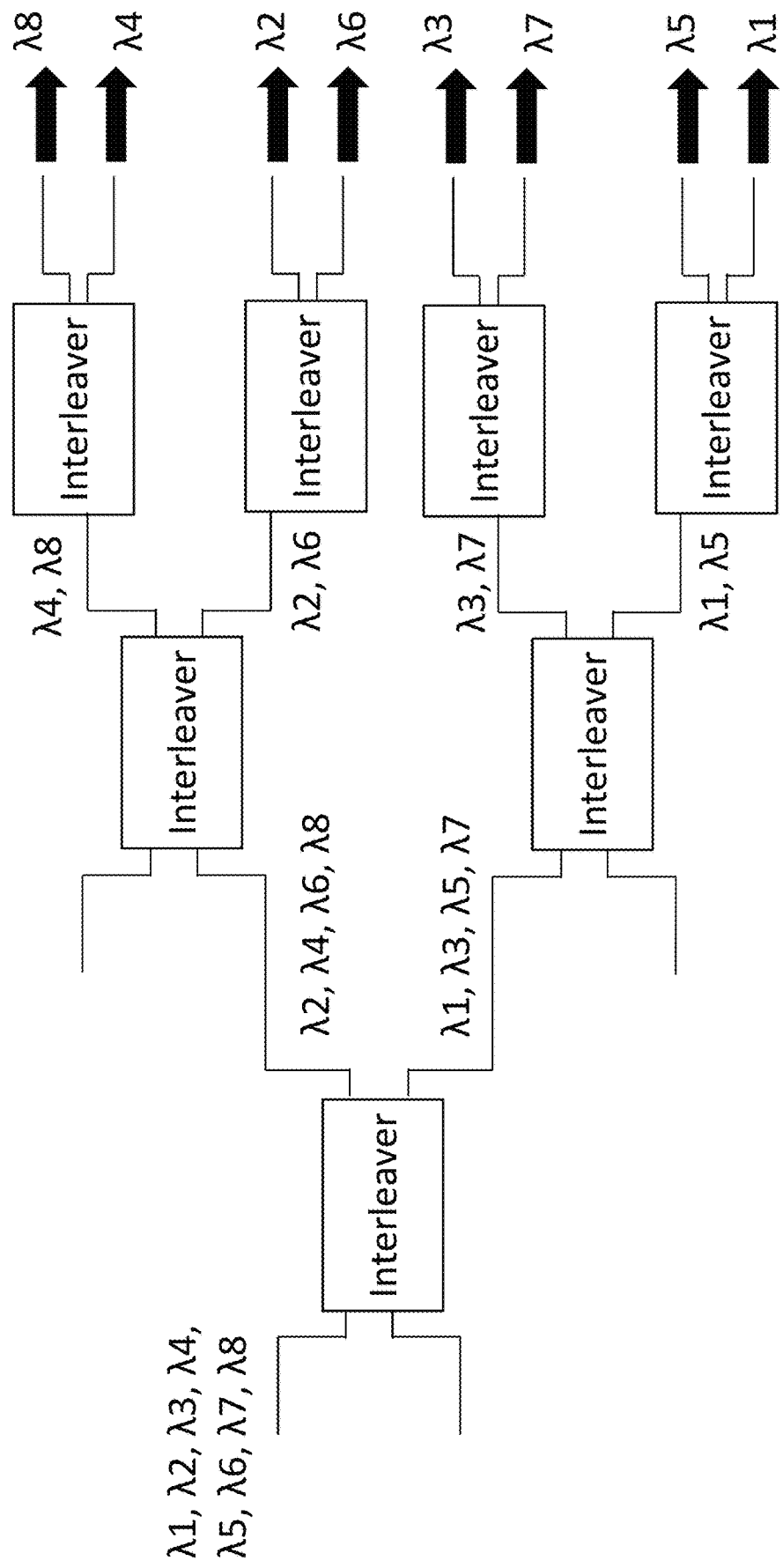
Figure 16:
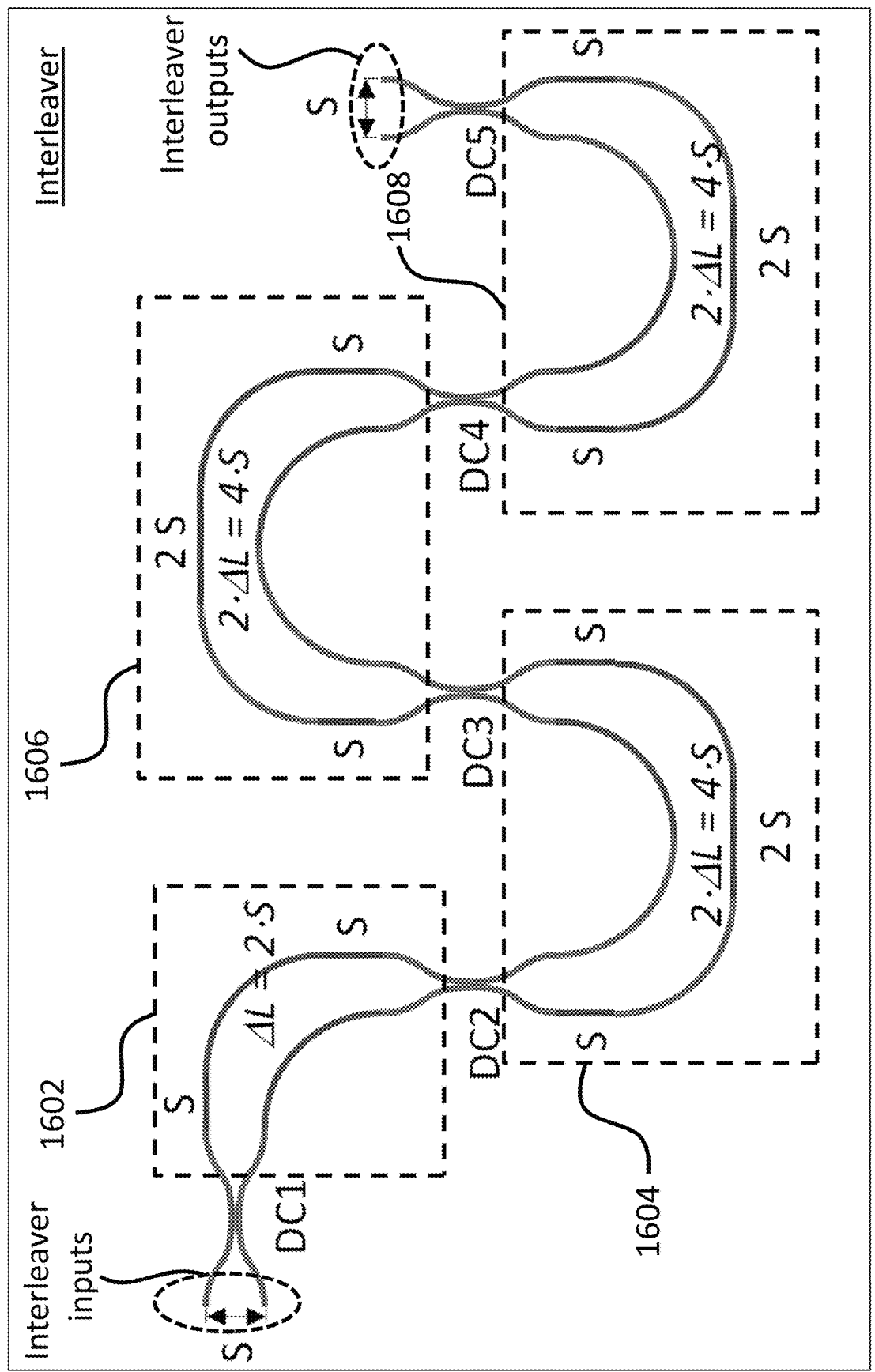
FIG. 16 illustrates architecture of each interleaver shown in FIGS. 14A, 14B, 15A, and 15B, in accordance with an embodiment.

The above-described architecture and design for an MZ interferometer may be used in wavelength multiplexing circuitry 206 (e.g. shown in FIG. 2) and a wavelength demultiplexer used in the optical communications system 100 (e.g. shown in FIG. 1). FIGS. 14A and 15A show general block diagrams of a four-channel interleaver-based wavelength multiplexing circuitry and an eight-channel interleaver-based wavelength multiplexing circuitry, respectively. Similarly, FIGS. 14B and 15B show general block diagrams of a four-channel interleaver-based wavelength demultiplexer and an eight-channel interleaver-based wavelength demultiplexer, respectively. The examples of FIGS. 14A, 14B, 15A, and 15B are implemented using a $\log_2 N$ architecture (e.g. where N=4). Each interleaver shown in FIGS. 14A, 14B, 15A, and 15B may be implemented using one or more MZ interferometers based on the above-described architecture and design. FIG. 16 shows an example where each interleaver shown in FIGS. 14A, 14B, 15A, and 15B is based on a Lattice Filter of order VII realized with the proposed architecture, where the angle of curvature $\vartheta$ is 90 degrees for the first stage 1602 and $\vartheta$ is 180 degrees for the second stage 1604, the third stage 1606, and the fourth stage 1608. Furthermore, the proposed architecture and design may be implemented in a WDM module and/or WDM network.

In comparison to current architectures, the architecture and design proposed in this disclosure provides several advantages. For example, the proposed architecture and design results in an MZ device (e.g. MZ interferometer, interleaver, multiplexer, and/or demultiplexer) that is compact (e.g. occupies an area much smaller compared to known solutions). The proposed architecture and design also results in an MZ device that is robust (e.g. reduced phase errors compared to known solutions). Such robustness may be provided by the close proximity of the two arms of the proposed MZ interferometer and by the possibility of reducing the length of the optical paths in the MZ interferometer (e.g. through the use of one or two 90° bends instead of the four used in current solutions and through the use of four to six multimode to single mode tapers instead of the four used in current solutions). The proposed architecture and design also results in an MZ device that has greater yield (e.g. reduced process-induced phase errors compared to known solutions, thus giving higher matching to given specifications).

In summary, a Mach-Zehnder interferometer architecture is proposed in which the path difference $\Delta L$ is a function of separation S, radius R of curvature, and angle of curvature. The arched waveguide used for interconnection is the same for both arms of the interferometer and can be a simple circumference arc of radius R or any other function optimized for minimizing losses. Furthermore, the path difference $\Delta L$ is obtained by two identical straight waveguides.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising:
   a first directional coupler;
   a second directional coupler;
   a first arched waveguide forming a first curved optical path between a first output port of the first directional coupler and a first input port of the second directional coupler, wherein the first arched waveguide has an angle of curvature and a radius of curvature;
   a second arched waveguide having the angle of curvature and the radius of curvature, the first arched waveguide and the second arched waveguide each having a concavity oriented in the same direction;
   a first straight waveguide coupling a second output port of the first directional coupler and a first end of the second arched waveguide; and
   a second straight waveguide coupling a second end of the second arched waveguide and a second input port of the second directional coupler, wherein the first straight waveguide, the second arched waveguide, and the second straight waveguide form a second curved optical path between the second output port of the first directional coupler and the second input port of the second directional coupler.

2. The device of claim 1, wherein the angle of curvature is less than or equal to 90 degrees, and wherein a path difference between the first curved optical path and the second curved optical path is equal to a sum of a length of the first straight waveguide and a length of the second straight waveguide.

3. The device of claim 2, wherein the length of the first straight waveguide is equal to the length of the second straight waveguide.

4. The device of claim 2, wherein the length of the first straight waveguide or the length of the second straight waveguide is less than or equal to a distance separating a pair of input ports of the first directional coupler.

5. The device of claim 1, wherein the first curved optical path intersects a bisector of the angle of curvature at a first point, wherein the second curved optical path intersects the bisector of the angle of curvature at a second point, and wherein a distance between the first point and the second point along the bisector of the angle of curvature is less than or equal to a distance separating a pair of input ports of the first directional coupler.

6. The device of claim 1, wherein each of the first arched waveguide and the second arched waveguide comprises an arched single-mode waveguide.

7. The device of claim 6, wherein each of the first straight waveguide and the second straight waveguide comprises a straight single-mode waveguide.

8. The device of claim 6, wherein each of the first straight waveguide and the second straight waveguide comprises a straight multi-mode waveguide, a first waveguide taper coupled to a first end of the straight multi-mode waveguide, and a second waveguide taper coupled to a second end of the straight multi-mode waveguide.

9. The device of claim 8, wherein a path difference between the first curved optical path and the second curved optical path is equal to two times a sum of a length of the first waveguide taper, a length of the straight multi-mode waveguide, and a length of the second waveguide taper.

10. The device of claim 1, wherein each of the first arched waveguide and the second arched waveguide comprises an arched multi-mode waveguide.

11. The device of claim 10, wherein each of the first straight waveguide and the second straight waveguide comprises a straight multi-mode waveguide, and wherein a path difference between the first curved optical path and the second curved optical path is equal to a sum of a length of the straight multi-mode waveguide of the first straight waveguide and the straight multi-mode waveguide of the second straight waveguide.

12. A device, comprising:
a first directional coupler;
a second directional coupler;
a first curved optical path having an angle of curvature, the first curved optical path comprising:
a first arched waveguide segment having a first end coupled to a first one of a pair of output ports of the first directional coupler; and
a second arched waveguide segment having a first end coupled to a second end of the first arched waveguide segment and a second end coupled to a first one of a pair of input ports of the second directional coupler; and
a second curved optical path, comprising:
a first straight waveguide segment having a first end coupled to a second one of the pair of output ports of the first directional coupler;
a third arched waveguide segment having a first end coupled to a second end of the first straight waveguide segment, the third arched waveguide segment having a length identical to a length of the first arched waveguide segment, the first arched waveguide segment and the third arched waveguide segment each having a concavity oriented in the same direction;
a second straight waveguide segment having a first end coupled to a second end of the third arched waveguide segment;
a third straight waveguide segment having a first end coupled to a second end of the second straight waveguide segment, the third straight waveguide segment having a length identical to a length of the second straight waveguide segment;
a fourth arched waveguide segment having a first end coupled to a second end of the third straight waveguide segment, the fourth arched waveguide segment having a length identical to a length of the second arched waveguide segment, the second arched waveguide segment and the fourth arched waveguide segment each having a concavity oriented in the same direction; and
a fourth straight waveguide segment having a first end coupled to a second end of the fourth arched waveguide segment and a second end coupled to a second one of the pair of input ports of the second directional coupler, wherein a path difference between the first curved optical path and the second curved optical path is equal to a sum of a length of the first straight waveguide and a length of the fourth straight waveguide.

13. The device of claim 12, wherein the fourth straight waveguide segment has a length identical to a length of the first straight waveguide segment.

14. The device of claim 12, wherein angle of curvature is equal to 180 degrees.

15. The device of claim 12, wherein a bisector of the angle of curvature intersects the first curved optical path at a first point, wherein the bisector of the angle of curvature intersects the second curved optical path at a second point, and wherein a distance between the first point and the second point along the bisector of the angle of curvature is equal to a length of the first straight waveguide segment.

16. The device of claim 12, wherein the device is a Mach-Zehnder interferometer.

17. An optical communications system, comprising:
a transmitter;
a receiver; and
an optical communications channel coupled between the transmitter and receiver, wherein the transmitter comprises a wavelength multiplexer, the wavelength multiplexer comprising a plurality of interleavers, wherein each of the plurality of interleavers comprises a Mach-Zehnder interferometer, the Mach-Zehnder interferometer comprising:
a first directional coupler;
a second directional coupler;
a first arched waveguide forming a first curved optical path between a first output port of the first directional coupler and a first input port of the second directional coupler, wherein the first arched waveguide has an angle of curvature and a radius of curvature;
a second arched waveguide having the angle of curvature and the radius of curvature, the first arched waveguide and the second arched waveguide each having a concavity oriented in the same direction;
a first straight waveguide coupling a second output port of the first directional coupler and a first end of the second arched waveguide; and
a second straight waveguide coupling a second end of the second arched waveguide and a second input port of the second directional coupler, wherein first straight waveguide, the second arched waveguide, and the second straight waveguide form a second curved optical path between the second output port of the first directional coupler and the second input port of the second directional coupler.

18. The optical communications system of claim 17, wherein each of the first arched waveguide and the second arched waveguide comprises an arched single-mode waveguide.

19. The optical communications system of claim 17, wherein each of the first straight waveguide and the second straight waveguide comprises a straight single-mode waveguide.

20. The optical communications system of claim 17, wherein each of the first arched waveguide and the second arched waveguide comprises an arched multi-mode waveguide.

* * * * *